Aug. 22, 1961  A. J. MANGINI  2,997,052
VEHICULAR TANK VALVE
Filed March 9, 1960  2 Sheets-Sheet 1

INVENTOR.
Andrew J. Mangini

BY Green, McCallister & Miller
HIS ATTORNEYS

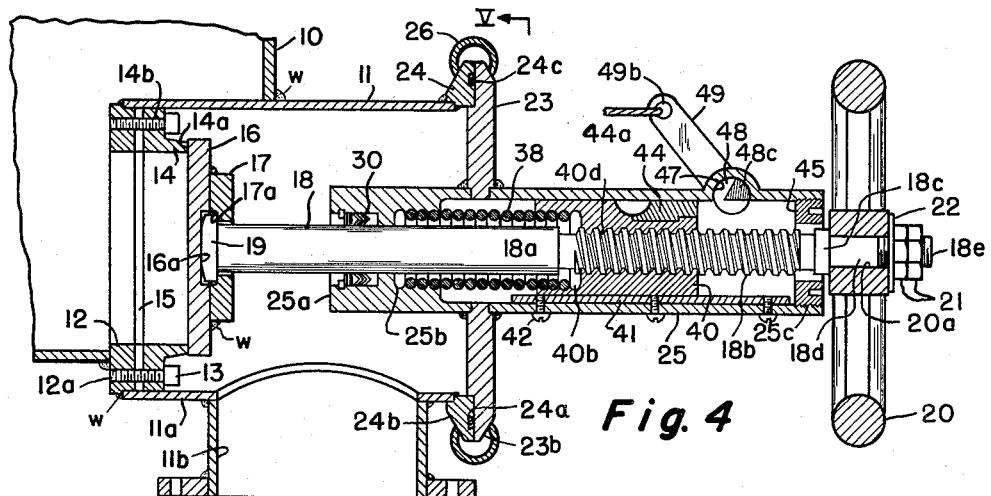

United States Patent Office
2,997,052
Patented Aug. 22, 1961

1

2,997,052
VEHICULAR TANK VALVE
Andrew J. Mangini, Warren, Pa., assignor to Pennsylvania Furnace and Iron Company, Warren, Pa., a corporation of Pennsylvania
Filed Mar. 9, 1960, Ser. No. 13,759
5 Claims. (Cl. 137—77)

This invention relates to a valve construction suitable for truck and trailer tanks that haul inflammable fluid products, and particularly to a positive-acting valve that may be quickly closed in an emergency, such as in the case of fire.

In this particular field of utilization, it has been customary to provide each tank or tank compartment of a bottom discharge tank with a shut-off valve that has a fusible section causing it to automatically close in case of fire, for example, when the temperature approaches 200° F. Such a type of valve should be capable of being located inside or as a part of the tank wall structure and loaded or urged towards a closed relationship with respect to its seat.

Heretofore, such a type of valve arrangement has not been entirely foolproof, in that it does not always form a fluid or liquid-tight seal. That is, the slightest amount of dirt or misalignment of the seat will produce a leak. Thus, it has been customary to provide a second or auxiliary valve that is positive-acting on the discharge line coming from the emergency valve, the auxiliary may then be utilized to normally manually open and close the flow of the fluid or liquid from the tank.

As will be appreciated, such an installation is rather complex and expensive and presents a problem from the standpoint of space limitations and further, from a safety standpoint. Weight and cost considerations also are factors that need to be met.

It has thus been an object of my invention to provide a new and improved valve structure which will solve the problem presented in the art, particularly from the standpoint of providing a both positive manual operation as well as a quickly-releasable safety type of valve operation;

Another object of my invention has been to meet the factors and requirements of an installation of the above type and to do so in a more practical and efficient manner;

A further object of my invention has been to devise a single valve construction which will meet the requirements and eliminate the need for a dual valve installation as well as eliminate the disadvantages of previous installations in this field;

These and other objects of my invention will appear to those skilled in the art from the embodiment illustrated in the drawings and described in the specification.

In the drawings, FIGURE 1 is a side sectional view in elevation through a valve installation or construction of my invention showing its valve head in a manually-produced open position;

FIGURE 4 is a view similar to and on the scale of FIGURES 1 and 2 showing the valve head in a tripped or snap-effected closed position;

FIGURE 5 is an end view in elevation and partial section on the scale of and taken along the line V—V of FIGURE 4;

FIGURE 6 is an enlarged somewhat diagrammatic side

2 sectional detail of parts of my valve construction employed in effecting its quick-releasing operation; and FIGURE 7 is an enlarged side sectional detail illustrating a packing gland employed in the valve construction.

In accordance with my invention, I provide a unitary valve construction which may, in effect, be a part of or located inside the bottom portion of the shell of the tank or tank compartment of a truck, trailer, or vehicular tank to serve the dual purpose of providing a simple-inexpensive and practical quick-closing valve that may be normally manually employed as a gate valve by screwing it into and out of a fully fluid-tight sealed-off relationship with respect to its seating surface. The latter operation will be the normal operation employed when the tank is to be emptied and then closed-off after emptying.

I provide force-exerting means, such as a spring, for normally urging the head of the valve towards and retaining it in its closed position, and employ a quick-release means and a slide to enable the head to be snapped by such force-exerting means to its closed position when an emergency arises. The latter type of operation may be either effected automatically by the melting or fusion of a fusible release element or port that is associated with a valve slide or by a shaft-operated latch means associated therewith which may be operated manually by a cable or remote control means, including an electrical, hydraulic or air system.

Figure 1:
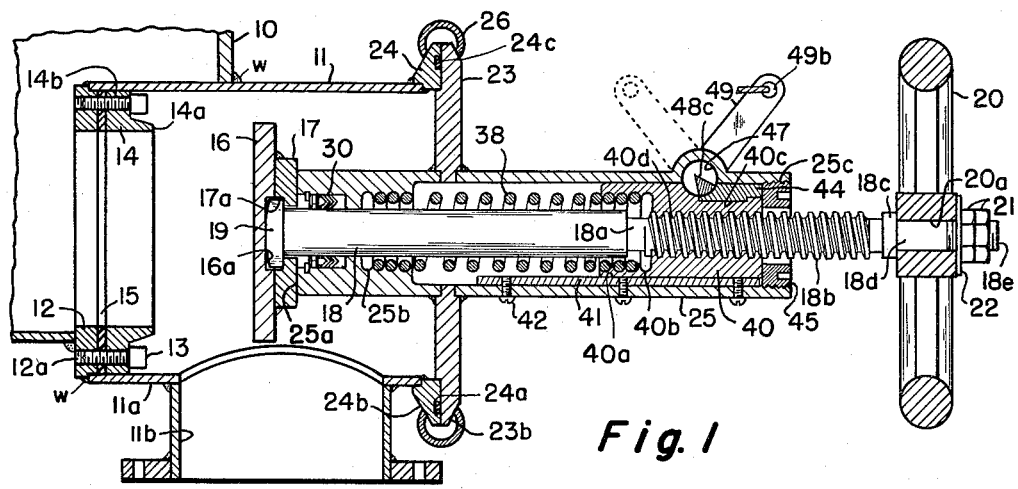

When my valve slide has been moved from its closing position to its backward or valve-closing position, it may then be moved to its valve-opening position by pulling it outwardly or forwardly against force exerted by the spring, if the operating shaft is in its forward position of FIGURE 1 and after the fusible element has been replaced (if it was used). At this time, the latching means of the operating shaft is turned to engage the slide (through the fusible element) and retain the slide in its forward position. The positive manual screw "in" and "out" valve stem may then be turned or adjusted to positively close and open the valve as desired.

Referring particularly to FIGURE 1 of the drawings, I have shown a bottom wall portion of a vehicular tank 10 as open or cut-out to receive a substantially cylindrical or annular housing duct 11 of my valve construction therein. An inlet portion 11a of the duct 11 may, as shown particularly in FIGURES 1, 2 and 4, be secured by weld metal w to the tank 10 to project forwardly-longitudinally therefrom and define a valve control chamber therefor. The duct 11 has a side or bottom outlet portion 11b extending perpendicular to the inlet portion 11a and open to the valve chamber.

A mounting ring part 12 is securely mounted, as by weld metal w within the inlet end portion 11a of the body 11 and is provided with threaded bores 12a to removably receive stem portions of mounting bolts 13. An annular valve seat part 14 has a base portion surmounted by an annular seating, fluid sealing-off, rim edge portion 14a. The base portion of the valve seat part 14 is provided with bores or holes 14b through which the bolts 13 extend to secure it against a sealing washer 15 and upon the mounting ring part 12.

A valve head 16 of circular, disc-like plate shape has a retaining ring 17 secured, as by welding, to its back face. As shown, for example, in FIGURE 1, the ring 17 has an annular groove 17a cut about its face adjacent its inner radius to cooperate with a circularly cut-out or hollow portion 16a of the valve head 16 to secure and retain a headed end 19 of a backwardly-projecting end portion of a valve stem 18. The valve stem 18 is positioned to extend longitudinally in substantial axial alignment with the valve seat part 14 and the inlet portion 11a, along and through a valve body or housing 25.

The stem 18 is adapted to project forwardly or outwardly from its headed portion 19 and is shown of smooth cylindrical contour to an intermediate portion 18a of reduced diameter and which carries an enlarged male screw thread portion 18b toward its forward end. At its outwardly-extending forward end portion, the stem 18 has a stop flange 18c, a wrench flat mounting portion 18d, and a threaded end portion 18e. A manual operating means, such as a wheel 20, has a female mounting wrench flat portion complementary with an adapted to be positioned on the male portion 18d of the stem, in order to key the wheel 20 to the forwardly-extending end of the shaft or stem 18. Nuts 21 and a washer 22 are employed to hold the hub of the wheel 20 against the flange portion 18c, in order to retain it in its mounted relationship on the wrench flat portion 18d, so that a rotation of the wheel 20 will impart a turning-adjustment of the shaft 18 within and with respect to a valve slide part 40.

The fluid chamber-defining and valve heading-operating chamber defining duct or housing 11 carries a longitudinally-extending substantially cylindrical valve body 25 whose open forward end portion has a mounting ring 24 that is secured thereto as by weld metal w. A disc-like front closure plate or disc member 23 has a central bore portion which directly carries the valve body 25. The mounting ring 24 has an abutment face provided with a key slot 24a to receive a gasket ring 24c (such as of rubber) to seal with the inside face of the closure plate or disc member 23.

As shown particularly in FIGURES 1 and 5, a split bonnet ring means 26 is adapted to abut against a sloped front edge face 23b of the plate member 23 and a sloped back edge face 24b of the mounting ring 24 to removably position the member 23. As shown in FIGURE 5, the two parts or segments of the bonnet ring means 26, each have a side clamping sleeve 27 to define clamping sleeve pairs on each side thereof through which nut and bolt assemblies 28 are adapted to extend. The assemblies 28 are employed to removably clamp the bonnet parts together and thus, removably position the forward closure plate member 23 and the valve body 25 with respect to the chamber-defining duct 11.

The back or inner end portion 25a of the valve body 25 has an inwardly cut-out of off-set, backwardly-open, end cavity to receive a removable, snap-ring packing assembly 30 (see FIGURE 7). The assembly 30 includes a snap retaining ring 31, a washer 32, a wedge-shaped tension spring 33, a washer 34, a male adaptor or wedge part 35, a series of annular, angle-shaped sealing rings 36 of suitable gasket material, and a female wedge-shaped inner adapter 37. The gasket portions 36 of the assembly 30 thus, at all times, provide a slide-seal with the forward end portion of the valve stem 18.

Figure 3:
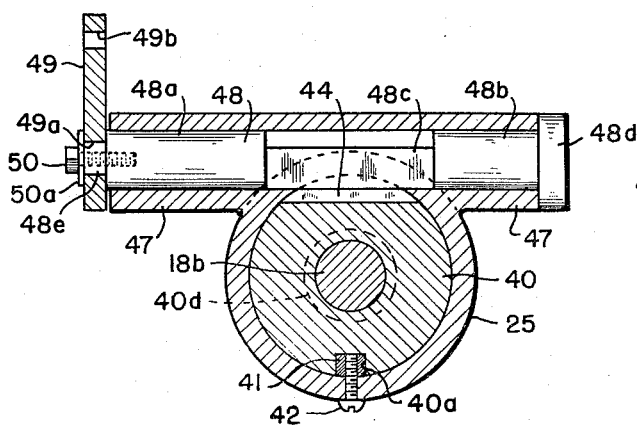
FIGURE 3 is an enlarged vertical end section along the line III—III of FIGURE 2 and particularly illustrating details of quick release means for effecting closing movement of its valve head.

A closing force-applying, helical contraction spring part 38 is positioned within and along the valve body 25 to extend axially therealong. At its back end, the spring 38 is secured within a series of annular grooved portions 25b of the valve body 25 and at its forward end, is secured within a similar set of grooved portions 40b of a slide member 40. It will be noted that the body 25 has a cylindrical chamber portion extending from its spring-mounting grooved portions 25b, forwardly toward its outer open-end, and that the slide member 40 of cylindrical outer shape or periphery is adapted to slide therealong, but without turning or rotating with respect thereto. A longitudinally-extending, rectangular, guide-slide part 41, see, for example, FIGURES 1 and 3, is removably secured to extend longitudinally along the inner wall of the body 25 by a series of threaded screws 42 and, as shown particularly in these figures, is adapted to extend along a longitudinal slot 40a of similar cross section in the outer periphery of the slide member 40 to prevent rotation of the latter within the valve body 25.

A fusible element 44 of a suitable fusible metal is carried within a forward, cut-out, end slot or segment 40c of the slide part 40 in a keyed-in relationship with respect thereto to, in effect, provide a complementary slide part therewith. As shown particularly in FIGURE 2, the fusible part 44 has a somewhat moon-shaped cross-section with a planar or flat inner face in abutment with and having an offset key portion complementary with the opposed face of the slide part 40. The fusible element 44 has a curved outer face that is complementary with the inner wall of the housing body 25, so as to be capable to sliding movement therealong with the slide part 40.

The assembly which comprises the slide part 40 and the fusible element or part 44 is removably held in position within the valve body or housing 25 by an annular retaining end ring member or part 45 which is threaded about its outer periphery to engage with threads 25c of the forward open end portion of the body part 25. When the slide part 40 and its element 44 are in an outer or forward position against the retaining ring 45, normal, positive-closing, manual operation of the valve stem 18 may be effected by turning the wheel 20. In this connection, it will be noted that the slide part 40 has a female or inner threaded portion 40d which engages the male threaded portion 18b of the valve stem 18.

Figure 2:
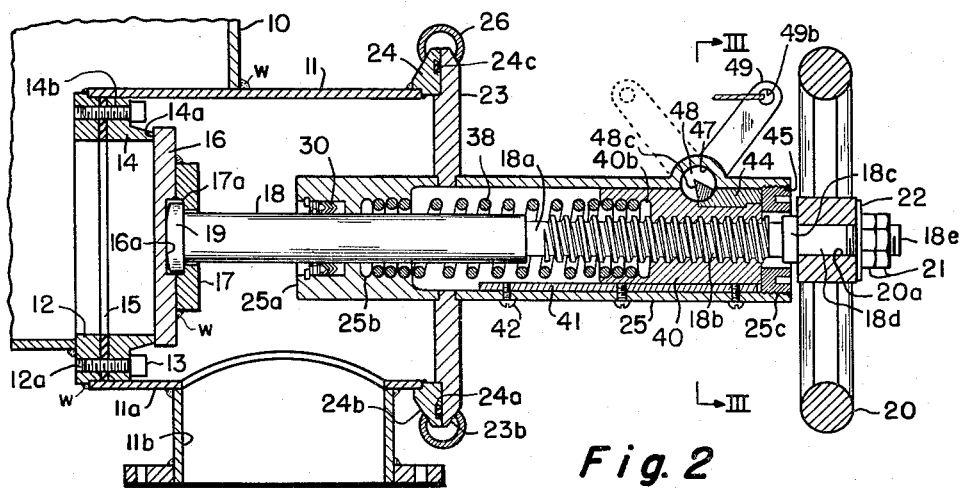
FIGURE 2 is a view similar to and on the scale of FIGURE 1 showing the construction of FIGURE 1 with its valve head in a positive, manually-effected, closed or seating position.

When the valve head 16 is in its open position of FIGURE 1, the spring 38 has been pulled outwardly, expanded or tensioned against its inherent resiliency or compression force by the slide 40, and when the valve head 16 is in its closed position of FIGURE 2, the spring 38 will be contracted. Even in the latter position, the spring 38 exerts a further closing force action to retain the slide 40 in its inner or backward, valve-closing position within the valve body 25.

As shown particularly in FIGURE 3, the body 25 at its back end is provided with a transverse, lateral or side-extending, hollow housing portion 47 to receive and operatively position or journal a valve-operating shaft 48 therein. As shown in FIGURE 3, the shaft 48 is a cross-shaft having a pair of spaced-apart, end-bearing portions 48a and 48b of cylindrical shape that are adapted to rotate within and be journaled by the inner wall of the transverse housing 47. The shaft 48 also has an intermediate or central, convexly-curved-face, segmental portion 48c of somewhat wedge or triangle-shaped section.

As shown particularly in FIGURES 1 and 2, the portion 48c acts as a latch or cam portion from the standpoint of its convex face to cooperate with a grooved latching portion defined by a complementally curved concave peripheral face 40e of the slide 40 and curved concave end face 44a of the fusible insert part 44. Thus, when the latch portion 48c is in the position of FIGURES 1 and 2, it will retain the part 44 and the slide 40 in their forward or outer normal positions, such that the valve head 16 may be opened and closed manually by rotating the wheel 20. However, when the shaft 48 is turned to the position of FIGURE 4, its cam or latch-holding portion 48c is moved out of engagement with the fusible part 44 and its curved face is within the outwardly-offset portion of the transverse housing 47; one of its flat side faces is in substantial alignment with the part 44, so as to permit forward sliding movement of such part and the slide member 40 along the inner wall of the housing part 25, as effected by the compression or closing force action of the spring 38.

It will also be apparent that if the temperature is sufficient to fuse or melt the element 44, the cut-out portion of the slide 40 is of sufficient extent to permit it to move to the position of FIGURE 4 without turning the latch portion 48c of the shaft 48. As shown in FIGURES 1 and 2, the rounded face of the cam portion 48c is of lesser extent than the back curved face edge of the fusible element 44, so that the fusible material will be free to flow into the space between the portion 48c of the shaft 48 and the bore of the cross housing 47.

Again referring to FIGURE 3, the shaft 48 is shown provided with an end flange 48d that rotatably abuts against one end of the cross housing 47 to close it off and retain the shaft in position. The other end 48a of the transverse operating shaft 48 is shown as having a projecting, wrench-flat, stub end portion 48e on which a complementally-shaped bore portion 49a of an actuating arm or lever 49 is adapted to fit. The lever arm 49 is removably secured in position by a threaded bolt and a washer 50a. The lever arm 49 may be manually operated adjacent the valve. However, it is shown provided with a connection bore 49b at its extending end to receive a remote control cable or operating mechanism which, for example, may terminate at a convenient location adjacent the driver's seat of the vehicle tractor.

What I claim is:

1. In a valve mechanism for operation within a discharge duct having an inlet portion mounted to extend from a fluid-containing vehicular tank and wherein the discharge duct has a valve seat within its inlet portion, an improved valve structure for both positive manual opening and closing and quick-release safety closing operations which comprises, a longitudinal housing body mounted to extend forwardly within the duct towards the valve seat and to extend backwardly-outwardly from the duct, a valve stem operatively positioned along said housing body and having a forward end portion extending into the duct, a valve head carried by the forward end portion of said valve stem for movement between opening and closing-off positions with respect to the valve seat, said valve stem having a threaded backwardly-extending end portion, a slide operatively positioned within said housing body for longitudinal movement therein and having an internal threaded portion adjustably engaging the threaded portion of said valve stem, means along said housing body and engaging said slide to guide said slide in its longitudinal movement therein and prevent rotation of said slide within said housing body, position-retaining means carried by said housing body and normally retaining said slide in a backward position within said housing body; manual rotating means at the backwardly-extending end portion of said valve stem for, when said slide is in its backward position, adjusting it within said slide to move said valve head between its opening and closing positions; resilient means about said valve stem and within said housing body and operatively connected at its forward end to said housing body and at its back end to said slide for urging said slide towards a forward position within said housing body to move the valve head towards its closing position, a fusible element positioned to extend longitudinally along and from a back end of said slide and in sliding engagement within said housing body, said slide and a forward end of said fusible element defining a transverse latching slot portion within said slide, said housing body having a transversely-offset portion defining a transversely-extending slot portion open to and in cooperative alignment with the slot portion of said slide and fusible element and defining an open area therewith, said position-retaining means including an operating shaft rotatably mounted in said offset portion and having a segmental latch portion operatively positioned within the open area and constructed to normally engage the forward end portion of said fusible element at the slot portion defined with said slide to hold said slide in its backward position within said housing body, and means for actuating said operating shaft to turn said latch portion within said offset portion and release said fusible element, so that said element and said slide will be moved forwardly by said resilient means within said housing body to move said valve head to its closing position independently of said manual rotating means.

2. In a valve mechanism as defined in claim 1 wherein, the slot portions define a substantially circular open area, and said latch portion has a convex face for turning movement within the circular open area along the slot portions.

3. In a valve mechanism as defined in claim 1 wherein, a retaining ring is threadably-removably positioned within a back end portion of said housing body to endwise-removably abut and position said slide and said fusible element therein, so that said slide may be removed from said housing body to replace said fusible element therein.

4. In a valve mechanism as defined in claim 1 wherein, said housing body has a fluid-sealing-off packing means carried within its forward end portion about said valve stem, and said resilient means has its forward end secured to said housing body backwardly of said packing means and has its back end extending within and secured to a forward end portion of said slide.

5. In a valve mechanism for operation within a discharge duct having an inlet portion mounted to extend from a fluid-containing vehicular tank and wherein the discharge duct has a valve seat within its inlet portion, an improved valve structure for both positive manual opening and closing and quick-release safety closing operations which comprises, a longitudinal housing body mounted to extend forwardly within the duct towards the valve seat and to extend backwardly-outwardly from the duct, a longitudinal valve stem operatively positioned along said housing body and having a forward end portion extending into the duct, a valve head carried by the forward end portion of said valve stem for movement between opening and closing-off positions with respect to the valve seat, said valve stem having a threaded backwardly-extending end portion, a slide operatively positioned within said housing body for longitudinal movement therein and having an internal threaded portion adjustably engaging the threaded portion of said valve stem, means along said housing body and engaging said slide to guide said slide in its longitudinal movement therein and prevent rotation of said slide within said housing body, position-retaining means carried by said housing body and normally retaining said slide in a backward position with said housing body; manual rotating means at the backwardly-extending end portion of said valve stem for, when said slide is in its backward position, adjusting it within said slide to move said valve head between its opening and closing position; spring means about said valve stem and in a spaced-apart relation within said housing body and operatively connected at its forward end within said housing body and at its back end within said slide for urging said slide towards a forward position within said housing body to move the valve head toward its closing position, a fusible segment positioned to extend longitudinally within and from a back end of said slide and in sliding engagement within said housing body, said slide and a forward end of said fusible segment defining a transferse latching slot portion within said slide, said housing body having a transversely-offset portion defining a transversely-extending slot portion open to and in cooperative alignment with the slot portion of said slide and fusible segment and defining an open area therewith, said position-retaining means including an operating shaft rotatably mounted in said offset portion and having a segmental latch portion of somewhat wedge-shape operatively-positioned within the open area and constructed to normally engage the forward end portion of said fusible segment at the slot portion defined with said slide to hold said slide in its backward position within said housing body, means for actuating said operating shaft to turn said latch portion within said offset portion and release said fusible segment, so that said fusible segment and said slide will be moved forwardly by said spring means within said housing body to move said valve head to its closing position independently of said manual rotating means; and said fusible segment, when heated to a fusing temperature, being constructed to flow into the transversely-extending slot portion defined by said offset portion and automatically release said slide for forward movement by said spring means within said housing body to move said valve head to its closing position with respect to the valve seat.

References Cited in the file of this patent

UNITED STATES PATENTS

| | | |
|---|---|---|
| 922,433 | Kieser | May 18, 1909 |
| 1,131,605 | Fisher | Mar. 9, 1915 |
| 2,128,059 | Siegert | Aug. 23, 1938 |
| 2,137,685 | Gillen | Nov. 22, 1938 |
| 2,840,337 | Sasserson | June 24, 1958 |